(12) United States Patent
Liu et al.

(10) Patent No.: US 12,373,364 B2
(45) Date of Patent: Jul. 29, 2025

(54) ASYNCHRONOUS FIFO READ/WRITE CONTROL METHOD AND SYSTEM, AND ELECTRONIC DEVICE

(71) Applicant: IEIT SYSTEMS CO., LTD., Shandong (CN)

(72) Inventors: Wei Liu, Shandong (CN); Shengcai Lu, Shandong (CN); Hongliang Wang, Shandong (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 0 days.

(21) Appl. No.: 18/878,995

(22) PCT Filed: Apr. 3, 2023

(86) PCT No.: PCT/CN2023/085935
§ 371 (c)(1),
(2) Date: Dec. 26, 2024

(87) PCT Pub. No.: WO2024/077890
PCT Pub. Date: Apr. 18, 2024

(65) Prior Publication Data
US 2025/0165412 A1     May 22, 2025

(30) Foreign Application Priority Data
Oct. 12, 2022  (CN) .......................... 202211244073.6

(51) Int. Cl.
*G06F 13/16*   (2006.01)
*G06F 13/40*   (2006.01)

(52) U.S. Cl.
CPC ...... *G06F 13/1689* (2013.01); *G06F 13/1642* (2013.01); *G06F 13/4027* (2013.01)

(58) Field of Classification Search
CPC ............ G06F 13/1689; G06F 13/1642; G06F 13/4027
See application file for complete search history.

(56) References Cited

U.S. PATENT DOCUMENTS 6,745,264 B1   6/2004   Luke et al.
8,713,221 B1   4/2014   Agrawal et al.
(Continued)

FOREIGN PATENT DOCUMENTS

| CN | 101403962 A | 4/2009 |
|----|-------------|--------|
| CN | 104580005 A | 4/2015 |

(Continued)

OTHER PUBLICATIONS

International Search Report and Written Opinion received for PCT Application No. PCT/CN2023/085935 on Jun. 23, 2023, 9 pgs.
(Continued)

*Primary Examiner* — Nimesh G Patel
(74) *Attorney, Agent, or Firm* — Merchant & Gould P.C.

(57) ABSTRACT

Disclosed are an asynchronous FIFO read/write control method and system, and an electronic device, belonging to the technical field of data read/write technology. The asynchronous FIFO read/write control method comprises: parsing data received by a front-end interface to obtain a data packet length and valid video data; determining an almost empty threshold of a first FIFO queue and a second FIFO queue according to the data packet length, and writing the valid video data into the first FIFO queue and the second FIFO queue in a ping-pong manner; determining a minimum time interval of FIFO readings according to a sending time sequence of a back-end interface, and reading data from the first FIFO queue and the second FIFO queue in the ping-pong manner according to the almost empty threshold and
(Continued)

the minimum time interval, so as to output the read data through the back-end interface.

19 Claims, 4 Drawing Sheets

(56) References Cited

U.S. PATENT DOCUMENTS

| | | | |
|---|---|---|---|
| 2004/0088439 | A1 | 5/2004 | Lee et al. |
| 2007/0162610 | A1* | 7/2007 | Un .................... H04L 1/0041 709/230 |
| 2007/0253430 | A1* | 11/2007 | Minami ................ H04L 45/54 370/395.52 |
| 2008/0307135 | A1* | 12/2008 | Jang .................. G06F 13/385 710/110 |
| 2009/0282166 | A1* | 11/2009 | Athani .............. G06F 15/17381 709/237 |
| 2015/0085587 | A1* | 3/2015 | Vallapaneni .......... G11C 11/419 365/189.05 |
| 2015/0139249 | A1* | 5/2015 | Suzuki .................. H04L 69/04 370/474 |

FOREIGN PATENT DOCUMENTS

| | | |
|---|---|---|
| CN | 104902193 A | 9/2015 |
| CN | 105183423 A | 12/2015 |
| CN | 107301136 A | 10/2017 |
| CN | 206557767 U | 10/2017 |
| CN | 110058816 A | 7/2019 |
| CN | 110781104 A | 2/2020 |
| CN | 114302087 A | 4/2022 |
| CN | 115309676 A | 11/2022 |
| WO | 2022095632 A1 | 5/2022 |

OTHER PUBLICATIONS

Chinese search report Pt. 1 received for CN Application No. 2022112440736, 2 pgs.
Chinese search report Pt. 2 received for CN Application No. 2022112440736, 1 pg.
Xiaoyu et al., "Linux MPEG-4", Computer Engineering, vol. 33, No. 8, Apr. 2007 (3 pages).

* cited by examiner

ASYNCHRONOUS FIFO READ/WRITE CONTROL METHOD AND SYSTEM, AND ELECTRONIC DEVICE

CROSS-REFERENCE TO RELATED APPLICATION

The present application is a National Stage Application of PCT International Application No.: PCT/CN2023/085935 filed on Apr. 3, 2023, which claims priority to Chinese Patent Application 202211244073.6, filed in the China National Intellectual Property Administration on Oct. 12, 2022, the disclosure of which is incorporated herein by reference in its entirety.

TECHNICAL FIELD

The present disclosure relates to the technical field of data read/write, and in particular, to an asynchronous FIFO read/write control method and system, and an electronic device.

BACKGROUND

In the design process of electronic devices such as a Virtual Reality (VR) headset and a mobile set-top box, etc., the requirement of bridging two interfaces generally exists. For example, an engineer needs to split an input video of a single interface into two video streams, and output the two video streams through two interfaces at half the bandwidth. Currently, there are mainly two common solutions, one is to use a dedicated bridge, and the other is to use a processor with a built-in interface. The dedicated bridge has problems such as a single function, poor expansibility and relatively high costs, etc. In the art, the solution for implementing interface bridging by using a processor is generally used. This solution needs to use asynchronous clock-based dual-First Input First Output (FIFO) ping-pong buffer read/write. Regarding such a manner, read/write conflict easily occurs, and it is difficult to implement asynchronous buffer processing of data with variable packet length.

Therefore, how to effectively control the dual-FIFO ping-pong buffer read/write in the interface bridging process to implement asynchronous buffer processing of data with variable packet length is a technical problem that currently needs to be solved by those having ordinary skill in the art.

SUMMARY

Embodiments of the present disclosure provide an asynchronous FIFO read/write control method and system, and an electronic device, which may effectively control dual-FIFO ping-pong buffer read/write in an interface bridging process to implement asynchronous buffer processing of data with variable packet length.

In order to solve the described technical problem, some embodiments of the present disclosure provide an asynchronous FIFO read/write control method, applied to a processor having a front-end interface and a back-end interface, the method includes:
  data received by the front-end interface is parsed to obtain a data packet length and valid video data;
  an almost empty threshold of a first FIFO queue and a second FIFO queue is determined according to the data packet length, and the valid video data is written into the first FIFO queue and the second FIFO queue in a ping-pong manner;
  a minimum time interval of FIFO readings is determined according to a sending time sequence of the back-end interface; and
  data is read from the first FIFO queue and the second FIFO queue in the ping-pong manner according to the almost empty threshold and the minimum time interval, so as to output the read data through the back-end interface.

In some embodiments of the present disclosure, before the valid video data is written into the first FIFO queue and the second FIFO queue in the ping-pong manner, the method further includes:
  an inter-lane sequence reordering operation is performed on the valid video data.

In some embodiments of the present disclosure, the almost empty threshold of the first FIFO queue and the second FIFO queue is determined according to the data packet length, includes:
  a queue depth of the first FIFO queue or the second FIFO queue is determined; and
  the almost empty threshold of the first FIFO queue and the second FIFO queue is calculated according to the data packet length and the queue depth; wherein the data packet length is positively correlated with the almost empty threshold, and the queue depth is positively correlated with the almost empty threshold.

In some embodiments of the present disclosure, before the valid video data is written into the first FIFO queue and the second FIFO queue in the ping-pong manner, the method further includes:
  it is judged whether the almost empty threshold has updated to the first FIFO queue and the second FIFO queue;
  when it is determined that the almost empty threshold has updated to the first FIFO queue and the second FIFO queue, proceed to the operation in which the valid video data is written into the first FIFO queue and the second FIFO queue in the ping-pong manner; and
  when it is determined that the almost empty threshold has not updated to the first FIFO queue and the second FIFO queue, proceed to the operation of judging whether the almost empty threshold has updated to the first FIFO queue and the second FIFO queue after delaying for a preset time.

In some embodiments of the present disclosure, data is read from the first FIFO queue and the second FIFO queue in the ping-pong manner according to the almost empty threshold and the minimum time interval, includes:
  an almost empty flag is set by using the almost empty threshold; wherein the almost empty flag is used for indicating whether the number of pieces of data in the first FIFO queue and the second FIFO queue is less than a preset number;
  a delay done signal is set by using the minimum time interval; wherein the delay done signal is used to indicate whether delay waiting is finished; and
  a data ping-pong read operation is performed on the first FIFO queue and the second FIFO queue according to the almost empty flag and the delay done signal.

In some embodiments of the present disclosure, the almost empty flag is set by using the almost empty threshold, includes:
  it is judged whether the number of pieces of data in the first FIFO queue and the second FIFO queue is less than the preset number;

when the number of pieces of data in the first FIFO queue and the second FIFO queue is less than the preset number, the almost empty flag is set as 1; and when the number of pieces of data in the first FIFO queue and the second FIFO queue is not less than the preset number, the almost empty flag is set as 0.

In some embodiments of the present disclosure, the delay done signal is set by using the minimum time interval, includes:

the delay done signal is set as 0 when performing the current FIFO read operation;

after completing the current FIFO read operation, a counter is started; and when the value of the counter is equal to the minimum time interval, the delay done signal is set as 1.

In some embodiments of the present disclosure, after the delay done signal is set as 1, the method further includes:

the value of the counter is reset.

In some embodiments of the present disclosure, a data ping-pong read operation is performed on the first FIFO queue and the second FIFO queue according to the almost empty flag and the delay done signal, includes:

it is judged whether the almost empty flag is 0 and the delay done signal is 1; wherein the almost empty flag being 0 represents that the number of pieces of data in the first FIFO queue and the second FIFO queue is less than or equal to a preset number, and the delay done signal being 1 represents that a delay between two successive read operations is completed;

when the almost empty flag is 0 and the delay done signal is 1, a data read operation is performed on the first FIFO queue and the second FIFO queue in the ping-pong manner.

Some embodiments of the present disclosure further provide an asynchronous FIFO read/write control system, applied to a processor having a front-end interface and a back-end interface, the system includes:

a parsing module, configured to parse data received by the front-end interface to obtain a data packet length and valid video data;

a threshold setting module, configured to determine an almost empty threshold of a first FIFO queue and a second FIFO queue according to the data packet length;

a write control module, configured to write the valid video data into the first FIFO queue and the second FIFO queue in the ping-pong manner;

a delay control module, configured to determine a minimum time interval of FIFO readings according to a sending time sequence of the back-end interface; and a read control module, configured to read data from the first FIFO queue and the second FIFO queue in the ping-pong manner according to the almost empty threshold and the minimum time interval, so as to output the read data through the back-end interface.

In some embodiments of the present disclosure, the processor is an FPGA, and the front-end interface is a hard-core MIPI D-PHY interface or a soft-core MIPI D-PHY interface constructed for the FPGA; and the back-end interface is a hard-core MIPI D-PHY interface or a soft-core MIPI D-PHY interface constructed for the FPGA.

In some embodiments of the present disclosure, the processor includes at least two of the back-end interfaces.

In some embodiments of the present disclosure, queue parameters of the first FIFO queue and the second FIFO queue are the same; wherein the queue parameters include a queue depth and a bit width.

Some embodiments of the present disclosure further provide an electronic device, including a processor having a front-end interface and a back-end interface;

wherein the processor is configured to parse data received by the front-end interface to obtain a data packet length and valid video data; the processor is also configured to determine an almost empty threshold of a first FIFO queue and a second FIFO queue according to the data packet length, and write the valid video data into the first FIFO queue and the second FIFO queue in the ping-pong manner; the processor is also configured to determine a minimum time interval of FIFO readings according to a sending time sequence of the back-end interface; and the processor is also configured to read data from the first FIFO queue and the second FIFO queue in the ping-pong manner according to the almost empty threshold and the minimum time interval, so as to output the read data through the back-end interface.

In some embodiments of the present disclosure, the electronic device includes a VR headset, a server, or a mobile set-top box.

Some embodiments of the present disclosure provide an asynchronous FIFO read/write control method, applied to a processor having a front-end interface and a back-end interface, said method including: data received by the front-end interface is parsed to obtain a data packet length and valid video data; an almost empty threshold of a first FIFO queue and a second FIFO queue is determined according to the data packet length, and the valid video data is written into the first FIFO queue and the second FIFO queue in the ping-pong manner; a minimum time interval of FIFO readings is determined according to a sending time sequence of the back-end interface; and data is read from the first FIFO queue and the second FIFO queue in the ping-pong manner according to the almost empty threshold and the minimum time interval, so as to output the read data through the back-end interface.

Some embodiments of the present disclosure are applied to a processor with built-in front-end interface and back-end interface. The processor determines a data packet length and valid video data according to data transmitted by the front-end interface, sets an almost empty threshold of a FIFO queue according to the data packet length, and determines a minimum time interval between two adjacent FIFO readings according to a sending time sequence of the back-end interface. In some embodiments of the present disclosure, the valid video data is written into the first FIFO queue and the second FIFO queue in the ping-pong manner, and ping-pong reading is also performed on the first FIFO queue and the second FIFO queue according to the almost empty threshold and the minimum time interval, such that the back-end interface outputs the read data. In some embodiments of the present disclosure, the FIFO almost empty threshold is dynamically set according to the data packet length corresponding to the front-end interface, and a fixed delay between two FIFO readings is set according to the sending time sequence of the back-end interface. The described method may effectively control dual-FIFO ping-pong buffer read/write in an interface bridging process to implement asynchronous buffer processing of data with variable packet length. Moreover, some embodiments of the present disclosure also provide an asynchronous FIFO read/write control system and an electronic device, which have the described beneficial effects and will not be described herein again.

BRIEF DESCRIPTION OF THE DRAWINGS

In order to describe embodiments of the present disclosure more clearly, hereinafter, accompanying drawings requiring to be used in the embodiments will be introduced briefly. Apparently, the accompanying drawings in the following description merely relate to some embodiments of the present disclosure, and for those having ordinary skill in the art, other accompanying drawings may also be obtained according to these accompanying drawings without involving any inventive effort.

DETAILED DESCRIPTION OF THE EMBODIMENTS

To make the objects, technical solutions and advantages of embodiments of the present disclosure clearer, hereinafter, the technical solutions in embodiments of the present disclosure will be described clearly and thoroughly in combination with the accompanying drawings in the embodiments of the present disclosure. Obviously, the embodiments as described are only some rather than all the embodiments of the present disclosure. All other embodiments obtained by those having ordinary skill in the art on the basis of the embodiments of the present disclosure without involving any inventive effort shall all fall within the scope of protection of the present disclosure.

Figure 1:
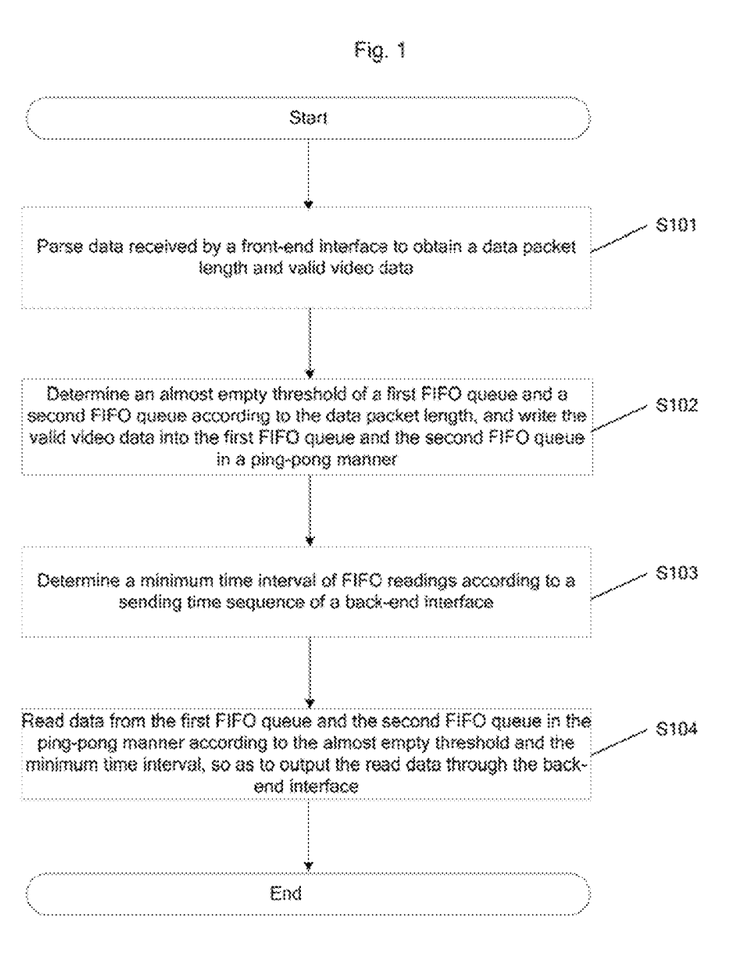
FIG. 1 is a flowchart of an asynchronous FIFO read/write control method provided according to embodiments of the present disclosure.

Hereinafter, please refer to FIG. 1, FIG. 1 is a flowchart of an asynchronous FIFO read/write control method provided according to embodiments of the present disclosure.

Operations may include:

S101: data received by a front-end interface is parsed to obtain a data packet length and valid video data.

Some embodiments of the present disclosure may be applied to a processor having a front-end interface and a back-end interface. When the processor includes one front-end interface and one back-end interface, bridging of one input one output may be implemented; when the processor includes one front-end interface and a plurality of back-end interfaces, bridging of one input multiple outputs may be implemented; and when the processor includes a plurality of front-end interfaces and one back-end interface, bridging of multiple inputs one output may be implemented. The processor may obtain the data packet length and the valid video data by parsing data received by the front-end interface, wherein the valid data refers to data except a packet header and a packet tail in the data received by the front-end interface, and the data packet length refers to a byte length of the valid video data.

As feasible embodiments, the processor may be an FPGA (Field-Programmable Gate Array), the front-end interface may be a front-end MIPI D-PHY (Mobile Industry Processor Interface D-PHY, one item in a mobile industry processor interface protocol) interface, and the back-end interface may be a back-end MIPI D-PHY interface. Therefore, S101 may be implemented in the following manner: COMMAND data received by the front-end MIPI D-PHY interface is parsed to obtain a data packet length and valid video data. The process uses a programmable logic device FPGA to realize MIPI DSI bridging. First, video at an MIPI receiving end needs to be buffered, then read out from the buffer, and finally sent out via an MIPI sending end according to a certain MIPI protocol. Currently, there are two modes for a link layer of the MIPI DSI: a COMMAND MODE and a VIDEO MODE. The video mode provides a continuous clock, an output end may use a CLK clock of an input end, and the buffer may be designed as a synchronous FIFO (First Input First Output) queue; and the command mode provides a non-continuous clock, an output end clock may only use an asynchronous clock, the buffer must be designed as asynchronous FIFO, moreover, the video resolution and a sending mode of the command mode are not fixed (a line mode, a segmented mode and a full-frame mode). Therefore, the asynchronous FIFO buffer needs to perform dynamic adaptive adjustment on various packet lengths. COMMAND data in some embodiments of the present disclosure refers to video data in the command mode. The FPGA may receive the COMMAND data via the front-end MIPI D-PHY interface, and may obtain the data packet length and the valid video data by parsing the COMMAND data. The valid data refers to data except a packet header and a packet tail in the COMMAND data, and the data packet length refers to a byte length of the valid video data.

S102: an almost empty threshold of a first FIFO queue and a second FIFO queue is determined according to the data packet length, and the valid video data is written into the first FIFO queue and the second FIFO queue in a ping-pong manner.

Before the operation S102, an operation of setting the first FIFO queue and the second FIFO queue may be performed, wherein the first FIFO queue and the second FIFO queue have the same depth and bit width. After the data packet length is obtained, some embodiments of the present disclosure may determine an almost empty threshold of the first FIFO queue and the second FIFO queue according to the data packet length, wherein the first FIFO queue and the second FIFO queue have the same almost empty threshold. The almost empty threshold is aempty_cnt, when the data amount contained in the FIFO queue is less than or equal to the almost empty threshold, an almost empty signal is valid (aempty is 1); the almost empty signal is transmitted to a downstream module B, and the downstream module is notified of stopping reading data, so as to prevent a data read operation from being still generated when there is no valid data in the FIFO queue. As feasible embodiments, in some embodiments of the present disclosure, correlation between length intervals and almost empty thresholds may be preset, and the almost empty threshold corresponding to the data packet length is determined on the basis of the correlation.

In some embodiments of the present disclosure, an inter-lane sequence reordering operation may be first performed on the valid video data, and the valid video data subjected to the inter-lane sequence reordering is written into the first FIFO queue and the second FIFO queue in the ping-pong manner.

S103: a minimum time interval of FIFO readings is determined according to a sending time sequence of the back-end interface.

The processor may also query the sending time sequence of the back-end interface, wherein the sending time sequence refers to a time sequence of sending video data. After the sending time sequence is obtained, a minimum time interval required for two FIFO readings is calculated according to the sending time sequence.

S104: data is read from the first FIFO queue and the second FIFO queue in the ping-pong manner according to the almost empty threshold and the minimum time interval, so as to output the read data through the back-end interface.

After the almost empty threshold and the minimum time interval are obtained, a data ping-pong read operation may be performed by using the almost empty threshold and the minimum time interval. When data in the first FIFO queue is less than the almost empty threshold, the reading of the first FIFO queue is stopped; and when data in the second FIFO queue is less than the almost empty threshold, the reading of the second FIFO queue is stopped. When the time interval between the current time and the time when the last FIFO reading is completed is less than the minimum time interval, a next read operation is not executed; and when the time interval between the current time and the time when the last FIFO reading is completed is greater than or equal to the minimum time interval, the next read operation may be executed. After ping-pong reading the data in the first FIFO queue and the second FIFO queue, the data may be encapsulated, and the encapsulated data is transmitted to the back-end interface, such that the back-end interface outputs the read data.

Some embodiments of the present disclosure are applied to a processor with built-in front-end interface and back-end interface. The processor determines a data packet length and valid video data according to data transmitted by the front-end interface, sets an almost empty threshold of a FIFO queue according to the data packet length, and determines a minimum time interval between two adjacent FIFO readings according to a sending time sequence of the back-end interface. In some embodiments of the present disclosure, the valid video data is written into the first FIFO queue and the second FIFO queue in the ping-pong manner, and ping-pong reading is also performed on the first FIFO queue and the second FIFO queue according to the almost empty threshold and the minimum time interval, such that the back-end interface outputs the read data. In some embodiments of the present disclosure, the FIFO almost empty threshold is dynamically set according to the data packet length corresponding to the front-end interface, and a fixed delay between two FIFO readings is set according to the sending time sequence of the back-end interface. The described method may effectively control dual-FIFO ping-pong buffer read/write in an interface bridging process to implement asynchronous buffer processing of data with variable packet length.

As further introduction to the embodiments corresponding to FIG. 1, the almost empty threshold may be determined in the following manner: a queue depth of the first FIFO queue or the second FIFO queue is determined, and the almost empty threshold of the first FIFO queue and the second FIFO queue is calculated according to the data packet length and the queue depth; wherein the data packet length is positively correlated with the almost empty threshold, and the queue depth is positively correlated with the almost empty threshold.

As feasible embodiments, according to some embodiments of the present disclosure, a lower limit value of a target interval may be determined according to the data packet length, an upper limit value of the target interval is determined according to the queue depth, and the almost empty threshold is selected from the target interval, for example, N times of the data packet length may be set as the lower limit value, where $N \geq 1$; and M times of the queue depth may also be set as the upper limit value, $0 < M < 1$.

As further introduction to the embodiments corresponding to FIG. 1, the almost empty threshold of the first FIFO queue and the second FIFO queue may be set first, and after the almost empty threshold is set, a ping-pong write operation is performed, and a flow is as follows:

operation A1: the almost empty threshold of the first FIFO queue and the second FIFO queue is determined according to the data packet length;

operation A2: the almost empty threshold is updated to the first FIFO queue and the second FIFO queue;

operation A3: it is judged whether the almost empty threshold has updated to the first FIFO queue and the second FIFO queue; when it is determined that the almost empty threshold has updated to the first FIFO queue and the second FIFO queue, proceed to operation A4; and when it is determined that the almost empty threshold has not updated to the first FIFO queue and the second FIFO queue, proceed to operation A5;

operation A4: the valid video data is written into the first FIFO queue and the second FIFO queue in the ping-pong manner; and operation A5: after delaying for a preset time, enter operation A3.

As further introduction to the embodiments corresponding to FIG. 1, data ping-pong reading may be implemented in the following manner:

operation B1: an almost empty flag is set by using the almost empty threshold;

wherein the almost empty flag is used for indicating whether the number of pieces of data in the first FIFO queue and the second FIFO queue is less than a preset number.

The process that the almost empty flag is set by using the almost empty threshold includes: it is judged whether the number of pieces of data in the first FIFO queue and the second FIFO queue is less than the preset number; when the number of pieces of data in the first FIFO queue and the second FIFO queue is less than the preset number, the almost empty flag is set as 1; and when the number of pieces of data in the first FIFO queue and the second FIFO queue is not less than the preset number, the almost empty flag is set as 0.

Operation B2: a delay done signal is set by using the minimum time interval;

wherein the delay done signal is used to indicate whether delay waiting is finished. The process that the delay done signal is set by using the minimum time interval includes: the delay done signal is set as 0 when performing the current FIFO read operation; after completing the current FIFO read operation, a counter is started; and when the value of the counter is equal to the minimum time interval, the delay done signal is set as 1. After the delay done signal is set as 1, the value of the counter may also be reset for next timing.

Operation B3: a data ping-pong read operation is performed on the first FIFO queue and the second FIFO queue according to the almost empty flag and the delay done signal.

In some embodiments of the present disclosure, it may be judged whether the almost empty flag is 0 and the delay done signal is 1; wherein the almost empty flag being 0 represents that the number of pieces of data in the first FIFO queue and the second FIFO queue is less than or equal to a preset number, and the delay done signal being 1 represents that a delay between two successive read operations is completed; when the almost empty flag is 0 and the delay done signal is 1, a data read operation is performed on the first FIFO queue and the second FIFO queue in the ping-pong manner; and when the almost empty flag is not 0 and/or the delay done signal is not 1, a data ping-pong read operation is not performed.

When the almost empty flag is 0 and the delay done signal is 1, a data ping-pong read operation may be performed; when the almost empty flag is 0 and the delay done signal is 0, then the data ping-pong read operation is not performed; when the almost empty flag is 1 and the delay done signal is 0, then the data ping-pong read operation is not performed; and when the almost empty flag is 1 and the delay done signal is 1, then the data ping-pong read operation is not performed.

In some embodiments of the present disclosure, corresponding almost empty flags may be set for the first FIFO queue and the second FIFO queue respectively, and the process above is illustrated by examples:

after reading data from the first FIFO queue, a counter is started to start timing; when the delay done signal is set as 1, it is judged whether the almost empty flag corresponding to the second FIFO queue is 0; when the almost empty flag is 0, data is read from the second FIFO queue; and when the almost empty flag is not 0, delay and wait are performed to write the valid video data into the second FIFO queue.

After reading data from the second FIFO queue, a counter is started to start timing; when the delay done signal is set as 1, it is judged whether the almost empty flag corresponding to the first FIFO queue is 0; when the almost empty flag is 0, data is read from the first FIFO queue; and when the almost empty flag is not 0, delay and wait are performed to write the valid video data into the first FIFO queue.

In Application Specific Integrated Circuit (ASIC) or Field Programmable Gate Array (FPGA) design, with the continuous improvement of design complexity, driving by a single clock cannot meet the design and application requirements, and the design of driving by a multi-clock system becomes more and more common. In the design of an asynchronous clock domain, the transmission of cross-clock domain clock data signals becomes a problem that must be considered. At present, a common method for single bit-data transmission is to use multi-stage register pipelining; and a common method for multi-bit data transmission is to use asynchronous FIFO. The process described in the foregoing embodiments is described below through embodiments in actual applications.

Currently, in the design process of a VR headset and a mobile set-top box, an engineer usually needs to split an input video of a single Mobile Industry Processor Interface (MIPI) Display Serial Interface (DSI) into two video streams, and output the two video streams through two MIPI DSIs at half the bandwidth. Sometimes, a "Passthrough" design from an MIPI DSI to an MIPI DSI may also require providing adapting to new display devices and upgrading MIPI DSI configuration requirements, or extending the distance between the processor and the display device for use as a signal repeater. Currently, there are mainly two common solutions used, one is to use a dedicated bridge, and the other is to use a programmable logic device FPGA with built-in MIPI Digital Physical Layer (D-PHY) (hard core or soft core). The dedicated bridge has problems such as a single function, poor expansibility and relatively high costs, etc., and thus herein, the solution of using the programmable logic device FPGA to implement MIPI DSI bridging is mainly introduced.

Some embodiments of the present disclosure provide a solution of variable packet length asynchronous FIFO read control processing. An almost empty threshold of FIFO is dynamically set by front-end packet length parsing; at the same time, a fixed delay between two FIFO readings is set according to a sending time sequence of a back-end MIPI; and operations, such as read/write conflict, with a certain probability are effectively avoided by a dual-FIFO ping-pong buffer mechanism, such that asynchronous buffer processing of data with variable packet length may be effectively solved.

Figure 2:
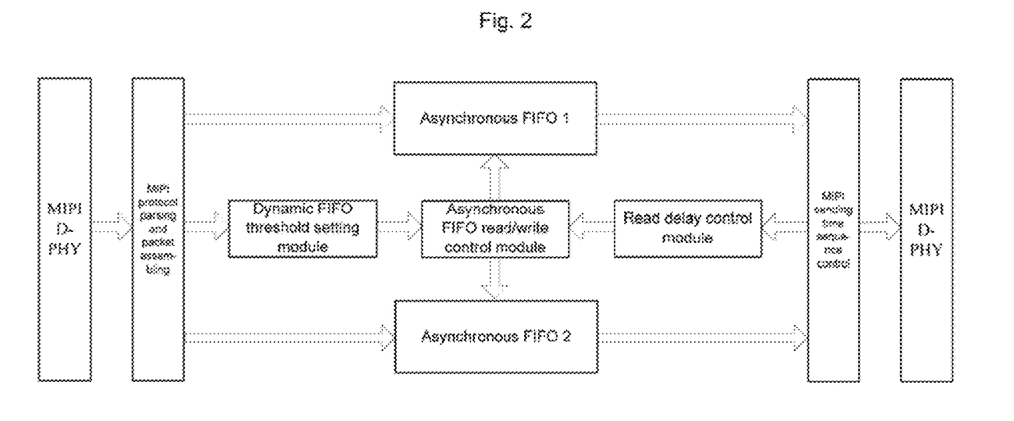
FIG. 2 is a schematic diagram of principle of variable packet length asynchronous FIFO read control processing provided according to embodiments of the present disclosure.

Please refer to FIG. 2, FIG. 2 is a schematic diagram of principle of variable packet length asynchronous FIFO read control processing provided according to embodiments of the present disclosure. FIG. 2 shows an MIPI D-PHY interface, an MIPI protocol parsing and packet assembling flow, a dynamic FIFO threshold setting module, an asynchronous FIFO read/write control module, a read delay control module, and an MIPI sending time sequence control flow MIPI D-PHY interface, in which asynchronous FIFO 1 is the first FIFO queue, and asynchronous FIFO 2 is the second FIFO queue. Some embodiments of the present disclosure use an FPGA as a hardware implementation unit, and design a variable packet length asynchronous FIFO buffer management method, in which a FIFO almost empty threshold is dynamically set according to previous-stage packet length information, and at the same time, a minimum delay between two FIFO readings is determined according to a subsequent-stage MIPI sending time sequence, and ping-pong read/write buffer is performed, which greatly facilitates an MIPI DSI bridging design solution and effectively avoids some disadvantages brought about by using the dedicated bridging, and also achieves flexible expansion of system functions at a later stage; and such an implementation may facilitate transplantation on various platforms, thereby shortening the research and development cycle of a product.

The MIPI protocol parsing module is configured to parse data packet length information and valid data information of the MIPI COMMAND, and perform inter-lane sequence reordering on the valid data at the same time. After the MIPI data packet length information is written into the dynamic FIFO threshold setting module, the dynamic FIFO threshold setting module calculates a FIFO almost empty threshold, and transmits same to the FIFO read/write control module to complete dynamic update of the FIFO threshold. The MIPI protocol parsing module is configured to delay the parsed valid data for several clocks and then write same into the two FIFOs in the ping-pong manner. The read delay control module is configured to calculate the minimum time interval required by two FIFO readings according to the sending time sequence of a back-end MIPI, and to set a delay parameter. When a read FIFO enable falling edge is detected (one FIFO read operation is completed), a counter switch is started; when a counter value is equal to the set delay parameter, a done signal is set as 1; and when the read enable next time is valid, the done signal is set as 0. The read FIFO enable is started when the FIFO almost empty flag is 0 and the done signal is 1 (satisfying interval delay between two read operation). When the FIFO almost empty flag becomes 1 (the FIFO is about to be read empty), the FIFO read enable is set as 0. Some embodiments of the present disclosure may expand multiple modules to accommodate multi-channel MIPI DSI input or output. After being read out from the FIFO, the data may be further processed, and then be output by the MIPI sending end; however, the read delay control module needs to appropriately adjust the delay parameter according to the timing sequence of a data processing module.

In some embodiments of the present disclosure, an MIPI D-PHY interface (hard core or soft core) built in an FPGA receives front-end MIPI COMMAND data, and the data enters the MIPI protocol parsing and packet assembling module to complete MIPI protocol parsing for parsing data packet length information and valid data information; the length information is sent to the dynamic FIFO threshold setting module to generate corresponding FIFO, so as to send an almost empty value to the FIFO read/write control module to complete the setting of the almost empty value for the FIFO. Moreover, inter-lane sequence reordering is performed on the valid data information, and two FIFO buffers are written under the control of the FIFO read/write control module in the ping-pong manner; and the read delay control module will set a corresponding read control delay on a sending time sequence of the COMMAND data according to a back-end MIPI D-PHY interface, so as to ensure that sufficient timing slack is maintained at an interval between two MIPI data sendings.

The implementation of the variable packet length asynchronous FIFO read control processing mainly includes the following operations:

operation B1: the MIPI D-PHY receives the front-end MIPI COMMAND data and sends same to the MIPI protocol parsing module to complete parsing of MIPI data packet length and valid video data; meanwhile, inter-lane sequence reordering is performed on the valid data;

operation B2: the data packet length information is sent to the dynamic FIFO threshold setting module, a FIFO almost empty threshold is calculated according to the data packet length and FIFO depth, and finally the FIFO almost empty threshold is sent to the FIFO read/write control module;

operation B3: the valid video data parsed on the basis of the MIPI protocol is delayed by several clocks (waiting until the FIFO almost empty threshold is completely updated), and is written into the two FIFOs in the ping-pong manner;

operation B4: the read delay control module calculates the minimum time interval required by two FIFO readings according to the sending time sequence of the back-end MIPI, and sets a delay parameter;

operation B5: when a read FIFO enable falling edge is detected (one FIFO read operation is completed), a counter switch is started; when a counter value is equal to the set delay parameter, a done signal is set as 1; and when the read enable next time is valid, the done signal is set as 0;

operation B6: the read FIFO enable is started when the FIFO almost empty flag is 0 and the done signal is 1 (satisfying interval delay between two read operation); and when the FIFO almost empty flag becomes 1 (the FIFO is about to be read empty), the FIFO read enable is set as 0; and operation B7: operations B3 to B6 are performed cyclically, for ping-pong writing and reading of the FIFO.

Figure 3:
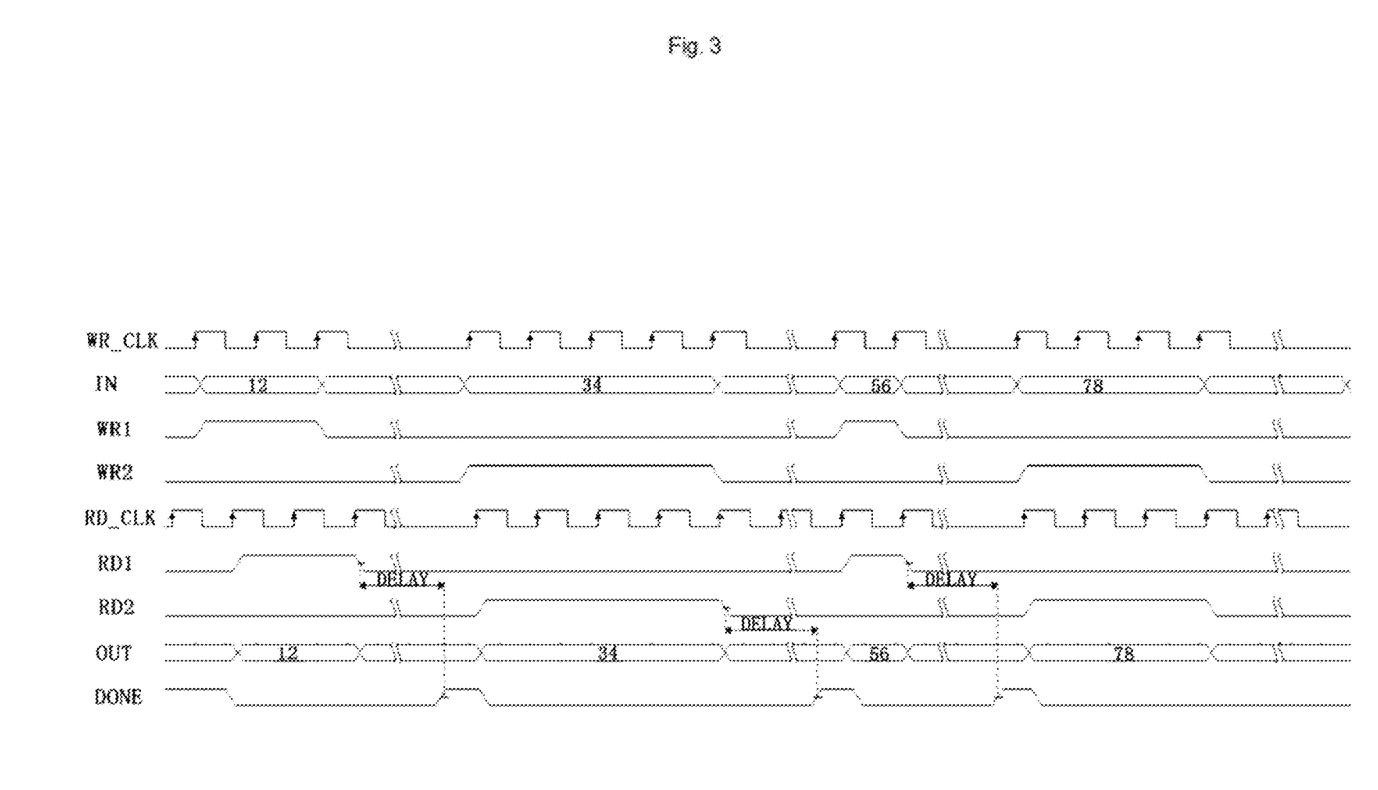
FIG. 3 is a timing diagram of variable packet length asynchronous FIFO read/write control provided according to embodiments of the present disclosure.

Please refer to FIG. 3, FIG. 3 is a timing diagram of read/write control of a variable packet length asynchronous FIFO provided in embodiments of the present disclosure. In the FIG. 3, WR_CLK represents a write clock, IN represents data input, WR1 represents writing data into the first FIFO queue, WR2 represents writing data into the second FIFO queue, RD_CLK represents a read clock, RD1 represents reading data from the first FIFO queue, RD2 represents reading data from the second FIFO queue, OUT represents data output, DONE represents a delay done signal, DELAY represents a delay, and the numbers 1, 2, 3, 4, 5, 6, 7, and 8 represent read/write data.

Some embodiments of the present disclosure use a programmable logic device FPGA with a plurality of built-in MIPI D-PHY (hard core or soft core) as hardware implementation. An algorithm is described by means of a hardware description language, and a data packet is parsed by the front-end MIPI protocol parsing module, for extracting packet length information, a FIFO almost empty threshold is calculated according to a FIFO depth, and is dynamically transferred to the FIFO read/write control module; the read delay control module generates a fixed read FIFO delay according to the sending time sequence of the back-end MIPI, and also, the dual-FIFO ping-pong buffer read/write effectively avoids read/write conflict of a certain probability. Using the FPGA as a hardware implementation unit facilitates flexible expansion of system functions at a later stage; and such an implementation may facilitate transplantation on various platforms, thereby shortening the research and development cycle of a product.

Figure 4:
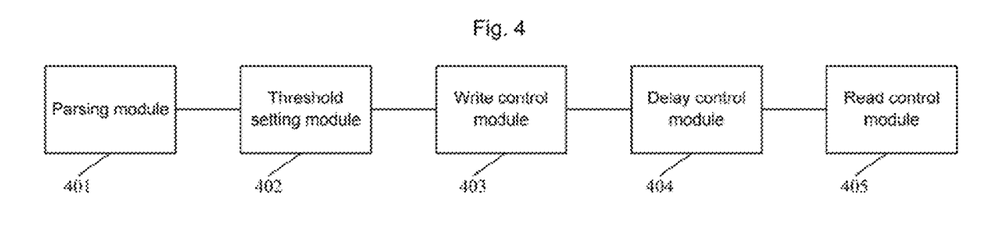
FIG. 4 is a schematic structural diagram of an asynchronous FIFO read/write control system provided according to embodiments of the present disclosure.

Please refer to FIG. 4, FIG. 4 is a schematic structural diagram of an asynchronous FIFO read/write control system provided according to embodiments of the present disclosure. The system may be applied to a processor having a front-end interface and a back-end interface, and includes:

a parsing module 401, configured to parse data received by the front-end interface to obtain a data packet length and valid video data;

a threshold setting module 402, configured to determine an almost empty threshold of a first FIFO queue and a second FIFO queue according to the data packet length;

a write control module 403, configured to write the valid video data into the first FIFO queue and the second FIFO queue in the ping-pong manner;

a delay control module 404, configured to determine a minimum time interval of FIFO readings according to a sending time sequence of the back-end interface; and a read control module 405, configured to read data from the first FIFO queue and the second FIFO queue in the ping-pong manner according to the almost empty threshold and the minimum time interval, so as to output the read data through the back-end interface.

Some embodiments of the present disclosure may be applied to a processor having a front-end interface and a back-end interface. When the processor includes one front-end interface and one back-end interface, bridging of one input one output may be implemented; when the processor includes one front-end interface and a plurality of back-end interfaces, bridging of one input multiple outputs may be implemented; and when the processor includes a plurality of front-end interfaces and one back-end interface, bridging of multiple inputs one output may be implemented. The processor may obtain the data packet length and the valid video data by parsing data received by the front-end interface, wherein the valid data refers to data except a packet header and a packet tail in the data received by the front-end interface, and the data packet length refers to a byte length of the valid video data.

As feasible embodiments, the processor may be an Field-Programmable Gate Array (FPGA), the front-end interface may be a front-end MIPI D-PHY interface, and the back-end interface may be a back-end MIPI D-PHY interface. Therefore, S101 may be implemented in the following manner: COMMAND data received by the front-end MIPI D-PHY interface is parsed to obtain a data packet length and valid video data. The process uses a programmable logic device FPGA to realize MIPI DSI bridging. First, video at an MIPI receiving end needs to be buffered, then read out from the buffer, and finally sent out via an MIPI sending end according to a certain MIPI protocol. Currently, there are two modes for a link layer of the MIPI DSI: a COMMAND MODE and a VIDEO MODE. The video mode provides a continuous clock, an output end may use a CLK clock of an input end, and the buffer may be designed as a synchronous FIFO (First Input First Output) queue; and the command mode provides a non-continuous clock, an output end clock may only use an asynchronous clock, the buffer must be designed as asynchronous FIFO, moreover, the video resolution and a sending mode of the command mode are not fixed (a line mode, a segmented mode and a full-frame mode). Therefore, the asynchronous FIFO buffer needs to perform dynamic adaptive adjustment on various packet lengths. COMMAND data in some embodiments of the present disclosure refers to video data in the command mode. The FPGA may receive the COMMAND data via the front-end MIPI D-PHY interface, and may obtain the data packet length and the valid video data by parsing the COMMAND data. The valid data refers to data except a packet header and a packet tail in the COMMAND data, and the data packet length refers to a byte length of the valid video data.

In some embodiments of the present disclosure, an operation of setting the first FIFO queue and the second FIFO queue may also be performed, wherein the first FIFO queue and the second FIFO queue have the same depth and bit width. After the data packet length is obtained, some embodiments of the present disclosure may determine an almost empty threshold of the first FIFO queue and the second FIFO queue according to the data packet length, wherein the first FIFO queue and the second FIFO queue have the same almost empty threshold. The almost empty threshold is aempty_cnt, when the data amount contained in the FIFO queue is less than or equal to the almost empty threshold, an almost empty signal is valid (aempty is 1); the almost empty signal is transmitted to a downstream module B, and the downstream module is notified of stopping reading data, so as to prevent a data read operation from being still generated when there is no valid data in the FIFO queue. As feasible embodiments, in some embodiments of the present disclosure, correlation between length intervals and almost empty thresholds may be preset, and the almost empty threshold corresponding to the data packet length is determined on the basis of the correlation.

The processor may also query the sending time sequence of the back-end interface, wherein the sending time sequence refers to a time sequence of sending video data. After the sending time sequence is obtained, a minimum time interval required for two FIFO readings is calculated according to the sending time sequence.

After the almost empty threshold and the minimum time interval are obtained, a data ping-pong read operation may be performed by using the almost empty threshold and the minimum time interval. When data in the first FIFO queue is less than the almost empty threshold, the reading of the first FIFO queue is stopped; and when data in the second FIFO queue is less than the almost empty threshold, the reading of the second FIFO queue is stopped. When the time interval between the current time and the time when the last FIFO reading is completed is less than the minimum time interval, a next read operation is not executed; and when the time interval between the current time and the time when the last FIFO reading is completed is greater than or equal to the minimum time interval, the next read operation may be executed. After ping-pong reading the data in the first FIFO queue and the second FIFO queue, the data may be encapsulated, and the encapsulated data is transmitted to the back-end interface, such that the back-end interface outputs the read data.

Some embodiments of the present disclosure are applied to a processor with built-in front-end interface and back-end interface. The processor determines a data packet length and valid video data according to data transmitted by the front-end interface, sets an almost empty threshold of a FIFO queue according to the data packet length, and determines a minimum time interval between two adjacent FIFO readings according to a sending time sequence of the back-end interface. In some embodiments of the present disclosure, the valid video data is written into the first FIFO queue and the second FIFO queue in the ping-pong manner, and ping-pong reading is also performed on the first FIFO queue and the second FIFO queue according to the almost empty threshold and the minimum time interval, such that the back-end interface outputs the read data. In some embodiments of the present disclosure, the FIFO almost empty threshold is dynamically set according to the data packet length corresponding to the front-end interface, and a fixed delay between two FIFO readings is set according to the sending time sequence of the back-end interface. The described method may effectively control dual-FIFO ping-pong buffer read/write in an interface bridging process to implement asynchronous buffer processing of data with variable packet length.

Further, the processor is an FPGA, and the front-end interface is a hard-core MIPI D-PHY interface or a soft-core MIPI D-PHY interface constructed for the FPGA. and
    the back-end interface is a hard-core MIPI D-PHY interface or a soft-core MIPI D-PHY interface constructed for the FPGA.

Further, the processor includes at least two back-end MIPI D-PHY interfaces.

Further, queue parameters of the first FIFO queue and the second FIFO queue are the same; wherein the queue parameters include a queue depth and a bit width.

Further, the system further includes:
    a reordering module, configured to perform an inter-lane sequence reordering operation on the valid video data before the valid video data is written into the first FIFO queue and the second FIFO queue in the ping-pong manner.

Further, The process that the threshold setting module 402 determines the almost empty threshold of the first FIFO queue and the second FIFO queue according to the data packet length includes: a queue depth of the first FIFO queue or the second FIFO queue is determined; and the almost empty threshold of the first FIFO queue and the second FIFO queue is calculated according to the data packet length and the queue depth; wherein the data packet length is positively correlated with the almost empty threshold, and the queue depth is positively correlated with the almost empty threshold.

Further, the system further includes:
    a delay judgment module, configured to judge whether the almost empty threshold has updated to the first FIFO queue and the second FIFO queue before the valid video data is written into the first FIFO queue and the second FIFO queue in the ping-pong manner; when it is determined that the almost empty threshold has updated to the first FIFO queue and the second FIFO queue, proceed to the operation in which the write control module 403 writes the valid video data into the first FIFO queue and the second FIFO queue in the ping-pong manner; and when it is determined that the almost empty threshold has not updated to the first FIFO queue and the second FIFO queue, proceed to the operation of judging whether the almost empty threshold has updated to the first FIFO queue and the second FIFO queue after delaying for a preset time.

Further, the process that the read control module 405 reads data from the first FIFO queue and the second FIFO queue in the ping-pong manner according to the almost empty threshold and the minimum time interval includes: an almost empty flag is set by using the almost empty threshold; wherein the almost empty flag is used for indicating whether the number of pieces of data in the first FIFO queue and the second FIFO queue is less than a preset number. a delay done signal is set by using the minimum time interval; wherein the delay done signal is used to indicate whether delay waiting is finished; and a data ping-pong read operation is performed on the first FIFO queue and the second FIFO queue according to the almost empty flag and the delay done signal.

Further, the process that the read control module 405 sets the almost empty flag by using the almost empty threshold includes: it is judged whether the number of pieces of data in the first FIFO queue and the second FIFO queue is less than the preset number; when the number of pieces of data in the first FIFO queue and the second FIFO queue is less than the preset number, the almost empty flag is set as 1; and when the number of pieces of data in the first FIFO queue and the second FIFO queue is not less than the preset number, the almost empty flag is set as 0.

Further, the process that the read control module 405 sets the delay done signal by using the minimum time interval includes: the delay done signal is set as 0 when performing the current FIFO read operation; after completing the current FIFO read operation, a counter is started; and when the value of the counter is equal to the minimum time interval, the delay done signal is set as 1.

Further, the system further includes:
a reset module, configured to reset the value of the counter to zero after the delay done signal is set to 1.

Further, the process that the read control module 405 performs a data ping-pong read operation on the first FIFO queue and the second FIFO queue according to the almost empty flag and the delay done signal includes: it is judged whether the almost empty flag is 0 and the delay done signal is 1; wherein the almost empty flag being 0 represents that the number of pieces of data in the first FIFO queue and the second FIFO queue is less than or equal to a preset number, and the delay done signal being 1 represents that a delay between two successive read operations is completed; when the almost empty flag is 0 and the delay done signal is 1, a data read operation is performed on the first FIFO queue and the second FIFO queue in the ping-pong manner.

The embodiments of the system part correspond to the embodiments of the method part; therefore, for the embodiments of the system part, reference may be made to the illustration of the embodiments of the method part, and they will not be repeated herein again.

Some embodiments of the present disclosure further provide an electronic device, including a processor having a front-end interface and a back-end interface; wherein the processor is configured to parse data received by the front-end interface to obtain a data packet length and valid video data; the processor is also configured to determine an almost empty threshold of a first FIFO queue and a second FIFO queue according to the data packet length, and write the valid video data into the first FIFO queue and the second FIFO queue in the ping-pong manner; the processor is also configured to determine a minimum time interval of FIFO readings according to a sending time sequence of the back-end interface; and the processor is also configured to read data from the first FIFO queue and the second FIFO queue in the ping-pong manner according to the almost empty threshold and the minimum time interval, so as to output the read data through the back-end interface. Definitely, the electronic device may further include various components such as a network interface and a power supply. The electronic device may be a VR headset, a server, or a mobile set-top box.

The processor may also perform an inter-lane sequence reordering operation on the valid video data before the valid video data is written into the first FIFO queue and the second FIFO queue in the ping-pong manner.

Further, The process that the processor determines the almost empty threshold of the first FIFO queue and the second FIFO queue according to the data packet length includes: a queue depth of the first FIFO queue or the second FIFO queue is determined; and the almost empty threshold of the first FIFO queue and the second FIFO queue is calculated according to the data packet length and the queue depth; wherein the data packet length is positively correlated with the almost empty threshold, and the queue depth is positively correlated with the almost empty threshold.

Further, the processor is also configured to judge whether the almost empty threshold has updated to the first FIFO queue and the second FIFO queue before the valid video data is written into the first FIFO queue and the second FIFO queue in the ping-pong manner; when it is determined that the almost empty threshold has updated to the first FIFO queue and the second FIFO queue, proceed to the operation in which the valid video data is written into the first FIFO queue and the second FIFO queue in the ping-pong manner; and when it is determined that the almost empty threshold has not updated to the first FIFO queue and the second FIFO queue, proceed to the operation of judging whether the almost empty threshold has updated to the first FIFO queue and the second FIFO queue after delaying for a preset time.

Further, The process that the processor reads data from the first FIFO queue and the second FIFO queue in the ping-pong manner according to the almost empty threshold and the minimum time interval includes: an almost empty flag is set by using the almost empty threshold; wherein the almost empty flag is used for indicating whether the number of pieces of data in the first FIFO queue and the second FIFO queue is less than a preset number; a delay done signal is set by using the minimum time interval; wherein the delay done signal is used to indicate whether delay waiting is finished; and a data ping-pong read operation is performed on the first FIFO queue and the second FIFO queue according to the almost empty flag and the delay done signal.

Further, the process that the processor sets the almost empty flag by using the almost empty threshold includes: it is judged whether the number of pieces of data in the first FIFO queue and the second FIFO queue is less than the preset number; when the number of pieces of data in the first FIFO queue and the second FIFO queue is less than the preset number, the almost empty flag is set as 1; and when the number of pieces of data in the first FIFO queue and the second FIFO queue is not less than the preset number, the almost empty flag is set as 0.

Further, the process that the processor sets the delay done signal by using the minimum time interval includes: the delay done signal is set as 0 when performing the current FIFO read operation; after completing the current FIFO read operation, a counter is started; and when the value of the counter is equal to the minimum time interval, the delay done signal is set as 1.

Further, the processor is further configured to reset the value of the counter to zero after the delay done signal is set to 1.

Further, the process that the processor performs a data ping-pong read operation on the first FIFO queue and the second FIFO queue according to the almost empty flag and the delay done signal includes: it is judged whether the almost empty flag is 0 and the delay done signal is 1; wherein the almost empty flag being 0 represents that the number of pieces of data in the first FIFO queue and the second FIFO queue is less than or equal to a preset number, and the delay done signal being 1 represents that a delay between two successive read operations is completed; when the almost empty flag is 0 and the delay done signal is 1, a data read operation is performed on the first FIFO queue and the second FIFO queue in the ping-pong manner.

Figure 5:
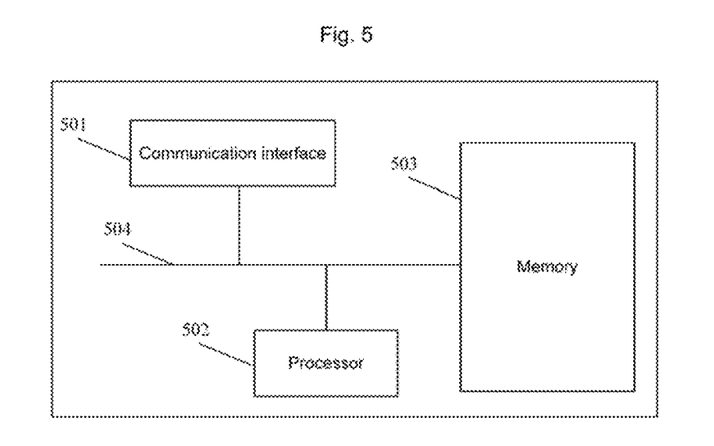
FIG. 5 is a schematic structural diagram of an electronic device provided according to embodiments of the present disclosure.

FIG. 5 is a schematic structural diagram of an electronic device provided according to embodiments of the present disclosure. As shown in FIG. 5, the electronic device includes:

a communication interface 501 capable of exchanging information with other devices such as network devices and the like; and a processor 502, which is connected to the communication interface 501 to implement information interaction with other devices, and is configured to execute, when running a computer program, the asynchronous FIFO read/write control method provided in one or more of the foregoing technical solutions. Moreover, the computer program is stored in a memory 503.

Certainly, in actual applications, the components in the electronic device are coupled together by using a bus system 504. It will be appreciated that the bus system 504 is used to implement connection communications between these components. In addition to a data bus, the bus system 704 further includes a power bus, a control bus, and a status signal bus. However, for purpose of clarity, in FIG. 5, various buses are labeled as the bus system 504.

Figure 6:
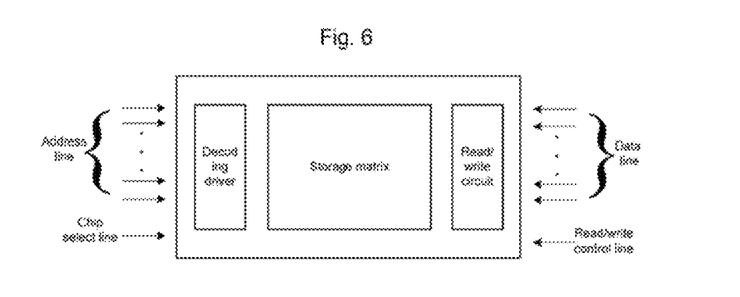
FIG. 6 is a schematic structural diagram of a non-transitory readable storage medium provided according to embodiments of the present disclosure.

Some embodiments of the present disclosure further provide a non-transitory readable storage medium, on which a computer program is stored, which when executed, implement the operations provided in the foregoing embodiments. The non-transitory readable storage medium may include: various media that may store program codes, such as a semiconductor storage, a USB flash disk, a removable hard disk, a Read-Only Memory (ROM), a Random Access Memory (RAM), a magnetic disk, or an optical disc. FIG. 6 is a schematic structural diagram of a non-transitory readable storage medium provided according to embodiments of the present disclosure. The non-transitory readable storage medium may be a non-transitory or non-transient storage, and includes a decoding driver, a storage matrix, a read/write circuit, an address line, a data line, a select line, and a read/write control line.

Various embodiments in the description are described in a progressive manner. Each embodiment focuses on differences from other embodiments. For the same or similar parts among the embodiments, reference may be made to each other. For the system disclosed in the embodiments, as the system corresponds to the method disclosed in the embodiments, the illustration thereof is relatively simple, and for the related parts, reference may be made to the illustration of the method part. It should be noted that, a person of ordinary skill in the art may further make several improvements and modifications to some embodiments of the present disclosure without departing from the principle of some embodiments of the present disclosure, and these improvements and modifications also belong to the scope of protection of the claims of the present disclosure.

It should also be noted that in the present description, relational terms such as first and second, etc. are only used to distinguish one entity or operation from another entity or operation, and do not necessarily require or imply any actual relationship or sequence between these entities or operations. Furthermore, terms "include", "including", or any other variations thereof are intended to cover a non-exclusive inclusion, such that a process, a method, an article, or a device that includes a series of elements not only includes those elements, but also includes other elements that are not explicitly listed, or further includes inherent elements of the process, the method, the article, or the device. Without further limitation, an element defined by a sentence "including a . . . " does not exclude other same elements existing in the process, the method, the article, or the device that includes the element.

The invention claimed is:

1. An asynchronous FIFO read/write control method, applied to a processor having a front-end interface and a back-end interface, the method comprising:
parsing data received by the front-end interface to obtain a data packet length and valid video data;
determining an almost empty threshold of a first First Input First Output (FIFO) queue and a second FIFO queue according to the data packet length, and writing the valid video data into the first FIFO queue and the second FIFO queue in a ping-pong manner;
determining a minimum time interval of FIFO readings according to a sending time sequence of the back-end interface; and
reading data from the first FIFO queue and the second FIFO queue in the ping-pong manner according to the almost empty threshold and the minimum time interval, so as to output the read data through the back-end interface;
wherein determining the minimum time interval of FIFO readings according to the sending time sequence of the back-end interface comprises:
querying the sending time sequence of the back-end interface; wherein the sending time sequence comprises a time sequence of sending data; and
calculating the minimum time interval between two FIFO readings according to the sending time sequence;
wherein the minimum time interval between two FIFO readings comprises a minimum time interval for reading data from the first FIFO queue and the second FIFO queue in the ping-pong manner.

2. The asynchronous FIFO read/write control method according to claim 1, wherein before writing the valid video data into the first FIFO queue and the second FIFO queue in a ping-pong manner, the method further comprises:
performing an inter-lane sequence reordering operation on the valid video data.

3. The asynchronous FIFO read/write control method according to claim 1, wherein determining the almost empty threshold of the first FIFO queue and the second FIFO queue according to the data packet length comprises:
  determining a queue depth of the first FIFO queue or the second FIFO queue; and
  calculating the almost empty threshold of the first FIFO queue and the second FIFO queue according to the data packet length and the queue depth; wherein the data packet length is positively correlated with the almost empty threshold, and the queue depth is positively correlated with the almost empty threshold.

4. The asynchronous FIFO read/write control method according to claim 1, wherein before writing the valid video data into the first FIFO queue and the second FIFO queue in the ping-pong manner, the method further comprises:
  judging whether the almost empty threshold has updated to the first FIFO queue and the second FIFO queue;
  when it is determined that the almost empty threshold has updated to the first FIFO queue and the second FIFO queue, proceeding to the operation of writing the valid video data into the first FIFO queue and the second FIFO queue in the ping-pong manner; and
  when it is determined that the almost empty threshold has not updated to the first FIFO queue and the second FIFO queue, proceeding to the operation of judging whether the almost empty threshold has updated to the first FIFO queue and the second FIFO queue after delaying for a preset time.

5. The asynchronous FIFO read/write control method according to claim 1, wherein reading data from the first FIFO queue and the second FIFO queue in the ping-pong manner according to the almost empty threshold and the minimum time interval comprises:
  setting an almost empty flag by using the almost empty threshold; wherein the almost empty flag is used for indicating whether the number of pieces of data in the first FIFO queue and the second FIFO queue is less than a preset number;
  setting a delay done signal by using the minimum time interval; wherein the delay done signal is used for indicating whether delay waiting is finished; and
  reading data from the first FIFO queue and the second FIFO queue in the ping-pong manner according to the almost empty flag and the delay done signal.

6. The asynchronous FIFO read/write control method according to claim 5, wherein setting the almost empty flag by using the almost empty threshold comprises:
  judging whether the number of pieces of data in the first FIFO queue and the second FIFO queue is less than the preset number;
  when the number of pieces of data in the first FIFO queue and the second FIFO queue is less than the preset number, setting the almost empty flag as 1; and
  when the number of pieces of data in the first FIFO queue and the second FIFO queue is not less than the preset number, setting the almost empty flag as 0.

7. The asynchronous FIFO read/write control method according to claim 5, wherein setting the delay done signal by using the minimum time interval comprises:
  when performing the current FIFO reading, setting the delay done signal as 0;
  after completing the current FIFO read operation, starting a counter; and
  when a value of the counter is equal to the minimum time interval, setting the delay done signal as 1.

8. The asynchronous FIFO read/write control method according to claim 7, wherein after setting the delay done signal as 1, the method further comprises:
  resetting the value of the counter.

9. The asynchronous FIFO read/write control method according to claim 5, wherein reading data from the first FIFO queue and the second FIFO queue in the ping-pong manner according to the almost empty flag and the delay done signal comprises:
  judging whether the almost empty flag is 0 and the delay done signal is 1; wherein the almost empty flag being 0 represents that the number of pieces of data in the first FIFO queue and the second FIFO queue is less than or equal to the preset number, and the delay done signal being 1 represents that a delay between two successive read operations is completed;
  when the almost empty flag is 0 and the delay done signal is 1, reading data from the first FIFO queue and the second FIFO queue in the ping-pong manner.

10. The asynchronous FIFO read/write control method according to claim 1, wherein reading data from the first FIFO queue and the second FIFO queue in the ping-pong manner according to the almost empty threshold and the minimum time interval comprises:
  stopping reading data from the first FIFO queue when data in the first FIFO queue is less than the almost empty threshold; and
  stopping reading data from the second FIFO queue when data in the second FIFO queue is less than the almost empty threshold.

11. The asynchronous FIFO read/write control method according to claim 1, wherein reading data from the first FIFO queue and the second FIFO queue in the ping-pong manner according to the almost empty threshold and the minimum time interval comprises:
  when the time interval between the current time and the time when the last FIFO reading is completed is less than the minimum time interval, not executing a next read operation; and
  when the time interval between the current time and the time when the last FIFO reading is completed is greater than or equal to the minimum time interval, executing the next read operation.

12. An asynchronous FIFO read/write control system, applied to a processor having a front-end interface and a back-end interface, the system comprising:
  a parsing module, configured to parse data received by the front-end interface to obtain a data packet length and valid video data;
  a threshold setting module, configured to determine an almost empty threshold of a first FIFO queue and a second FIFO queue according to the data packet length;
  a write control module, configured to write the valid video data into the first FIFO queue and the second FIFO queue in a ping-pong manner;
  a delay control module, configured to determine a minimum time interval of FIFO readings according to a sending time sequence of the back-end interface; and
  a read control module, configured to read data from the first FIFO queue and the second FIFO queue in the ping-pong manner according to the almost empty threshold and the minimum time interval, so as to output the read data through the back-end interface;
  wherein the delay control module is configured to determine a minimum time interval of FIFO readings according to a sending time sequence of the back-end interface by following steps:

querying the sending time sequence of the back-end interface; wherein the sending time sequence comprises a time sequence of sending data; and calculating the minimum time interval between two FIFO readings according to the sending time sequence;

wherein the minimum time interval between two FIFO readings comprises a minimum time interval for reading data from the first FIFO queue and the second FIFO queue in the ping-pong manner.

13. The asynchronous FIFO read/write control system according to claim 12, wherein the processor is an FPGA, and the front-end interface is a hard-core MIPI D-PHY interface or a soft-core MIPI D-PHY interface constructed for the FPGA; and the back-end interface is a hard-core MIPI D-PHY interface or a soft-core MIPI D-PHY interface constructed for the FPGA.

14. The asynchronous FIFO read/write control system according to claim 13, wherein the parsing module is configured to parse COMMAND data received by the front-end MIPI D-PHY interface to obtain a data packet length and valid video data; wherein a link layer of an MIPI DSI comprises a COMMAND MODE and a VIDEO MODE, the COMMAND data being video data in the COMMAND MODE.

15. The asynchronous FIFO read/write control system according to claim 14, wherein the valid video data comprise data other than a packet header and a packet tail in the COMMAND data.

16. The asynchronous FIFO read/write control system according to claim 13, wherein the delay control module is configured to calculate the minimum time interval required by two FIFO readings according to the sending time sequence of a back-end MIPI, and to set a delay parameter.

17. The asynchronous FIFO read/write control system according to claim 12, wherein the processor comprises at least two of the back-end interfaces.

18. The asynchronous FIFO read/write control system according to claim 12, wherein queue parameters of the first FIFO queue and the second FIFO queue are the same; wherein the queue parameters comprise a queue depth and a bit width.

19. An electronic device, comprising a processor having a front-end interface and a back-end interface;

wherein the processor is configured to parse data received by the front-end interface to obtain a data packet length and valid video data; the processor is also configured to determine an almost empty threshold of a first FIFO queue and a second FIFO queue according to the data packet length, and write the valid video data into the first FIFO queue and the second FIFO queue in a ping-pong manner; the processor is also configured to determine a minimum time interval of FIFO readings according to a sending time sequence of the back-end interface; and the processor is also configured to read data from the first FIFO queue and the second FIFO queue in the ping-pong manner according to the almost empty threshold and the minimum time interval, so as to output the read data through the back-end interface;

wherein the processor is further configured to determine a minimum time interval of FIFO readings according to a sending time sequence of the back-end interface by following steps:

querying the sending time sequence of the back-end interface; wherein the sending time sequence comprises a time sequence of sending data; and calculating the minimum time interval between two FIFO readings according to the sending time sequence;

wherein the minimum time interval between two FIFO readings comprises a minimum time interval for reading data from the first FIFO queue and the second FIFO queue in the ping-pong manner.

\* \* \* \* \*